United States Patent
Marks

[11] 3,960,505
[45] June 1, 1976

[54] ELECTROSTATIC AIR PURIFIER USING CHARGED DROPLETS

[76] Inventor: Alvin M. Marks, 153-16 10th Ave., Whitestone, N.Y. 11357

[22] Filed: Feb. 4, 1974

[21] Appl. No.: 439,264

Related U.S. Application Data

[63] Continuation-in-part of Ser. No. 211,350, Dec. 23, 1971, abandoned.

[52] U.S. Cl. .................................. 23/284; 55/10; 55/122; 55/139
[51] Int. Cl.² ........................................ C01B 17/82
[58] Field of Search ............ 55/107, 101, 117, 118, 55/120, 122, 133, 136, 137, 138, 139, 146, 150, 155, DIG. 38, 10; 310/4, 5, 6, 10, 11; 23/284; 250/530

[56] References Cited
UNITED STATES PATENTS

| | | | |
|---|---|---|---|
| 2,357,354 | 9/1944 | Penney | 55/107 |
| 2,525,347 | 10/1950 | Gilman | 55/107 |
| 2,638,555 | 5/1953 | Marks | 204/312 |
| 2,778,443 | 1/1957 | Yereance | 55/102 |
| 2,863,527 | 12/1958 | Herbert et al. | 55/73 |
| 3,191,077 | 6/1965 | Marks et al. | 310/5 |
| 3,297,887 | 1/1967 | Marks | 310/4 |
| 3,331,192 | 7/1967 | Peterson | 55/107 |
| 3,417,267 | 12/1968 | Marks | 310/6 |
| 3,503,704 | 3/1970 | Marks | 55/122 |
| 3,520,662 | 7/1970 | Marks | 23/284 |
| 3,551,710 | 12/1970 | Gourdine | 310/10 |

Primary Examiner—Bernard Nozick
Attorney, Agent, or Firm—Albert F. Kronman

[57] ABSTRACT

A charged aerosol device for air purification and other uses. Droplets from a capillary tube are passed through an electric field having an intensity just below breakdown. The droplets are thereby broken into minute particles and produce a fine spray. The resulting large surface area of the spray absorbs noxious gases within the range of a 6th power law. By adjusting the flow rates to an optimum value, the device can be made to generate electric power in excess of that needed to operate the apparatus. A flow of clean dry air is introduced around the aerosol capillary tube and charging electrode to eliminate the possibility of electrode fouling and shorting. High temperature exhaust gases, in another arrangement, are first partially cooled before introduction to the charged aerosol.

1 Claim, 9 Drawing Figures

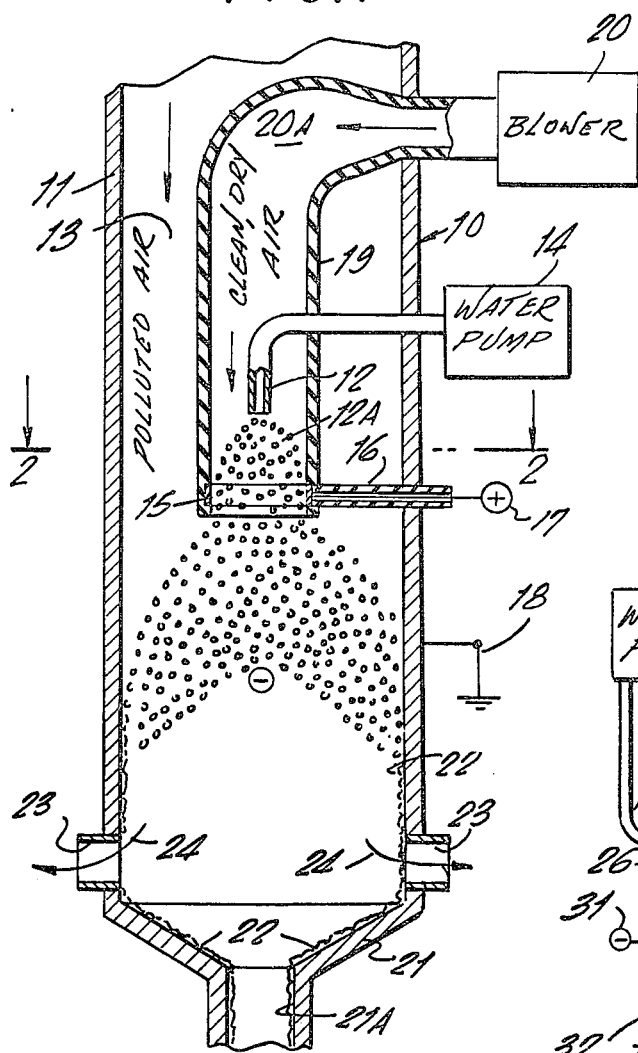
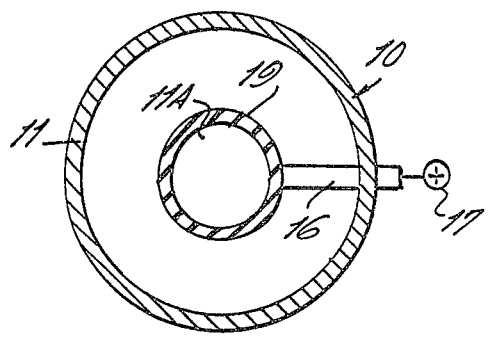
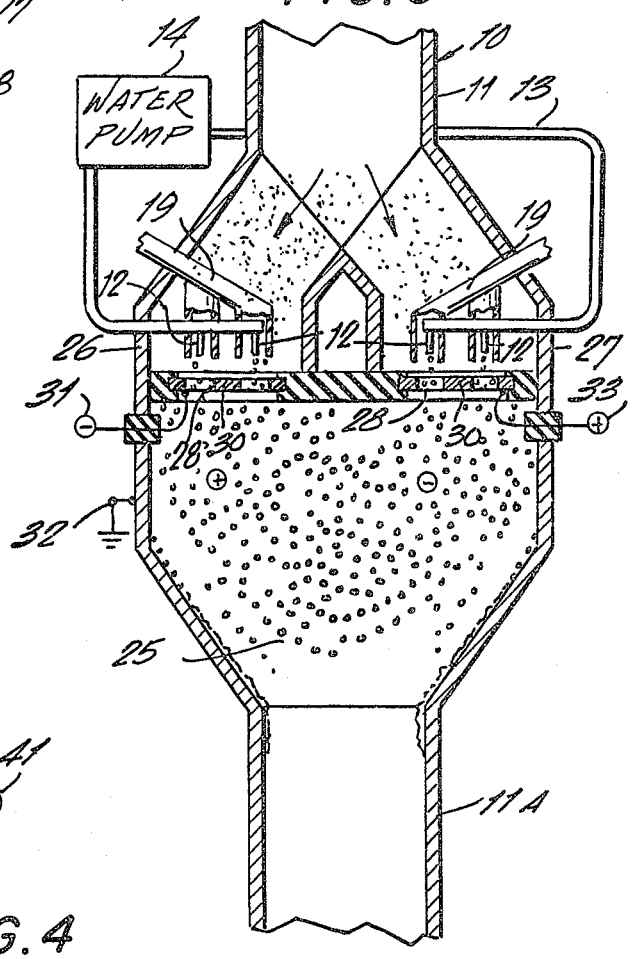
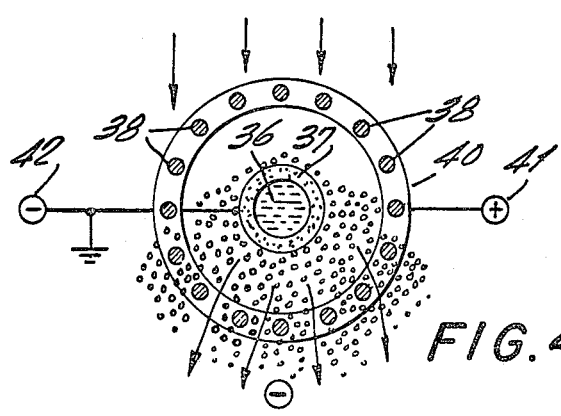

FLOW PARAMETER = $\psi = A_2 \dfrac{Q_1}{Q_2^2}$ $(cm/min)^{-1}$

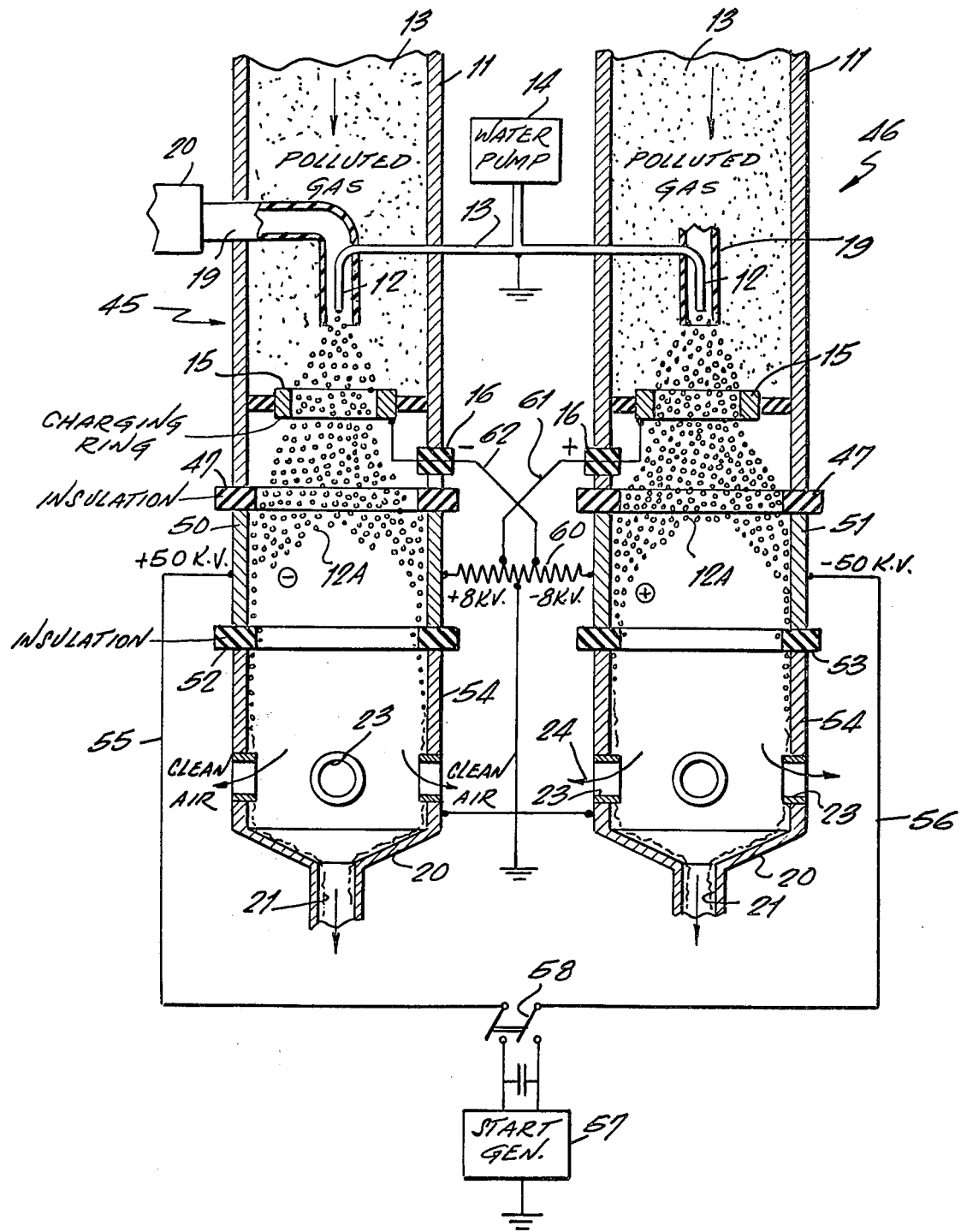

3,960,505

ELECTROSTATIC AIR PURIFIER USING CHARGED DROPLETS

RELATED APPLICATION

This application is a continuation-in-part of an application for patent entitled "Air Purifier Using Charged Aerosols," filed Dec. 23, 1971, now abandoned, by Alvin M. Marks.

BACKGROUND OF THE INVENTION

Many attempts have been made to clear a polluted atmosphere of noxious gases by the use of fine water jets and spray devices. Such devices have been successful to a degree, but their efficiency and speed of operation has been generally unsatisfactory due to the use of droplets which are generally too large to make efficient contact with the air molecules.

It has been shown in U.S. Pat. Nos. 3,503,704 and 3,520,662, issued to Alvin M. Marks, that a charged aerosol spray device has superior air purification performance over prior art devices for many reasons, including the large surface area which resulted from the formation of the charged aerosol. However, these prior art devices were subject to operational and performance limitations caused by short circuiting within the device, the buildup of moisture on the capillary tube, the improper relationship between the applied voltage, the speed of the flow of noxious gas through the device, and, in some instances, the excessive high temperature of the air or gas to be purified.

Accordingly, it is an object of the present invention to provide air purification devices employing charged aerosols which overcome the shortcomings of prior art teachings.

Another object of the present invention is to provide air purification devices employing charged aerosols which can operate at higher voltages and with more rapid and complete absorption or reaction with noxious gases.

Still another object of the present invention is to provide air purification devices which can be used with high temperature exhaust gases, such as are emitted by an internal combustion engine.

BRIEF DESCRIPTION OF THE DRAWINGS

In the accompanying drawings forming a part hereof similar elements have been given identical reference numerals in which drawings:

FIG. 1 is a somewhat diagrammatic cross-sectional view of one form of the invention using a single conduit, a single charging ring, and an enclosed liquid dispensing capillary tube, FIG. 2 is a cross-sectional view of the purifier shown in FIG. 1 and is taken along line 2—2 of that figure, FIG. 3 is a cross-sectional, somewhat diagrammatic view of a double conduit purifier using multiple charging rings and a double polarity electrical source of potential, FIG. 4 is a cross-sectional view of an alternate form of liquid spray emitting device and charger, FIG. 8 is a cross-sectional view of two conduit purifiers cross connected for self generating the electrical power required for its own operation.

SUMMARY

Figure 6:
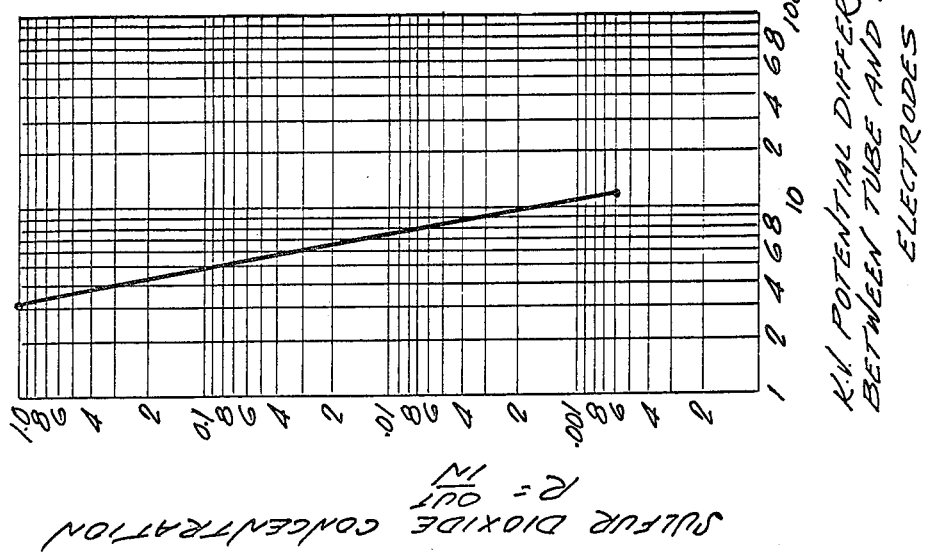
FIG. 6 is a graph showing the relationship of a sulfur dioxide concentration ratio in and out of the purifier, plotted in relationship to the applied potential difference.
Figure 5:
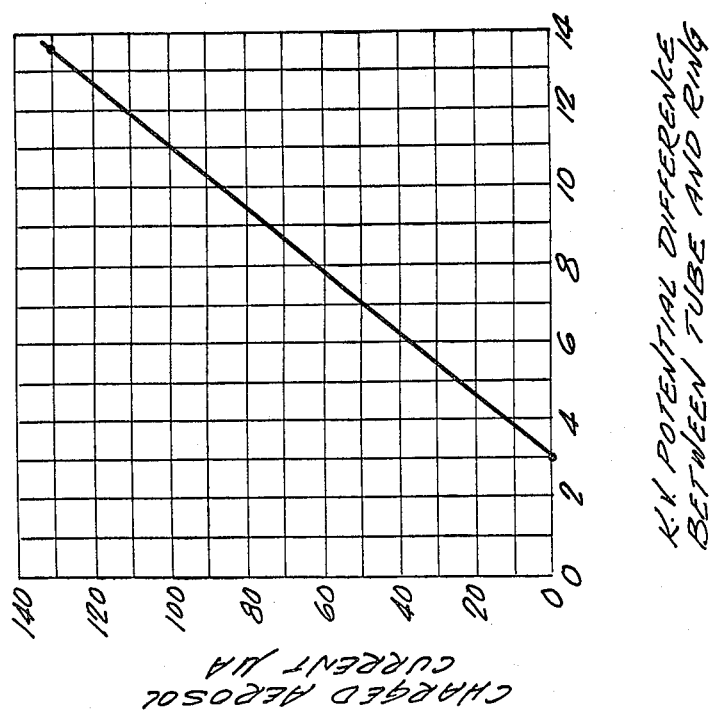
FIG. 5 is a graph showing the relationship of the current carried by the charged aerosol flow to the voltage applied between the small liquid dispensing capillary tube and the charging ring.
Figure 7:
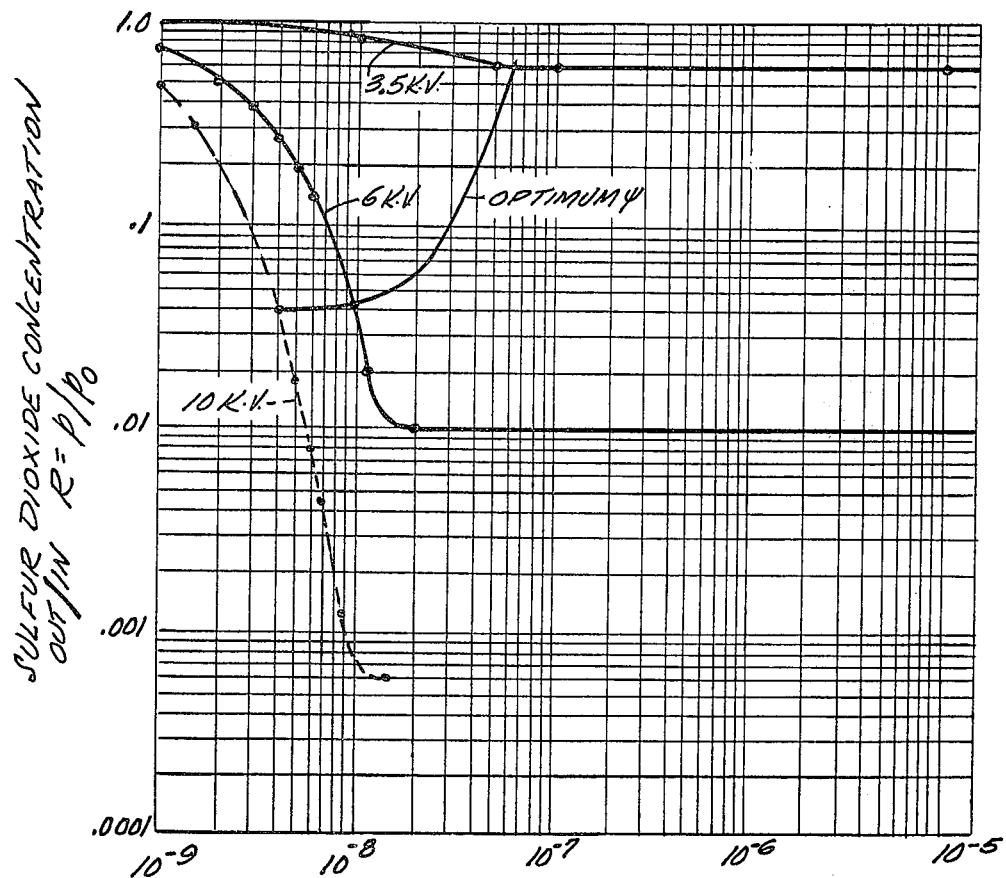
FIG. 7 is a graph showing the relationship of a flow parameter $\psi$ to the sulfur dioxide concentration in/out ratio.

A volume of air containing pollutants, such as noxious gases and particulates is directed under pressure through a conduit. One or more capillary tubes through which a liquid is directed is disposed within the conduit in the path of the polluted air. One or more ring shaped electrodes is disposed within the conduit downstream of the capillary tube and a potential difference applied between the end of the capillary tube and the ring electrode. Drops of water coming from the end of the capillary tube enter the intense electric field between the tube and the ring electrode and are simultaneously formed into a fine spray of charged sub-microscopic sized droplets. The charged aerosol comprisng monopolar charged liquid droplets passes through the ring electrode and into the stream of polluted air or gas. The charged droplets collectively have a very great surface area and rapidly and completely absorb the noxious gases. As the liquid droplets progress through the conduit, they mutually repel each other, by reason of their like charge, and coalesce upon the inner walls of the conduit from which they are collected as a liquid, together with the entrained and absorbed pollutants.

Various apparatus employing the charged aerosol principles, operating conditions and ranges to achieve high efficiency are disclosed.

DESCRIPTION OF THE PREFERRED EMBODIMENTS

Referring to the drawings, and particularly to FIGS. 1 and 2, there is shown an air purifier 10 having an enclosing conduit 11 through which the polluted gas 13 is directed. An electrically conductive, liquid dispensing pipe 12 (hereinafter referred to as a capillary tube), is led into the conduit 11. The capillary tube 12 has a very fine bore and is curved so as to discharge liquid along the longitudinal axis of the conduit 11.

The liquid, which is preferably water, is fed into the capillary tube under pressure by a water pump 14. The capillary tube 12 emits a fine spray of water droplets indicated at 12A, which are directed toward a metal charging ring 15. The charging ring 15 forms a positive electrode and is connected, through an insulator 16, to a terminal 17 for the application of a direct current voltage of 3,000 volts or more. The terminal 18 of the voltage source is connected to the conduit 11 and is grounded. The intense electrical field between the capillary tube 12 and the charging ring 15 causes the water droplets 12A to break up into sub-microscopic sized charged liquid droplets within the field.

In the embodiment shown in FIG. 1, the capillary tube 12 is surrounded by a duct 19. The duct 19 may be formed of material such as Teflon. The charging ring electrode 15 is secured to the inside surface of the duct 19. A small volume of clean dry air indicated at 20A is directed through the duct 19 by a blower 20. In this manner, liquid coming from the capillary tube 12 is prevented from building up on the capillary tube 12 so that no spark or arc will be generated between the capillary tube 12 and the charging ring 15.

As the stream of minute charged droplets of the aerosol thus formed leave the charging ring 15, they are mutually repelled by reason of their like charge and move in the direction of the wall of the conduit 11. The droplets 12A eventually strike the wall of the conduit 11 and coalesce thereon into a film of liquid 22. In the course of the travel of the droplets from the charging ring 15 to the wall of the conduit 11, the polluted air or gas 13 passing through the conduit 11 becomes entrained or absorbed by the droplets. The droplets within the aerosol have collectively a large surface area and are therefore capable of picking up substantially all of the gaseous and particulate matter within the polluted stream.

The lower, or downstream, end of the conduit 11 is connected to a fluid catch basin 21 having a central opening 21A for the disposal of the coalesced droplets. The droplets' film 22 which runs down the conduit surface into the basin 21 is led out of the air purifier through opening 21A. A plurality of lateral openings 23 are cut in the conduit 11 for the escape of the purified air, as indicated by arrows 24.

The ability of the charged aerosol formed by the present device to remove the pollutants from a stream of gas will be understood by the following:

A neutral water spray formed by spray nozzles in the absence of an electric field produces drops having a diameter of 1.0 to 10 microns. After disruption in the electrical field as hereinabove described, the charged droplets have a diameter of $10^{-4}$ to $10^{-2}$ microns. Thus, for the same volume of liquid, the charged submicron droplets have from $10^8$ to $10^2$ times the surface area of the neutral droplets, and consequently interact in a much smaller interval of time much more completely with the surrounding gas containing the pollutants.

The air purifier shown in FIG. 3 employs an input conduit 11 and an output conduit 11A. The input conduit 11 is forked to form divisional conduits 26, 27. A plate-like charging electrode 30 having apertures 28 therein, is disposed across the exit end of each of the divisional conduits 26, 27. Upstream of each aperture 28, a capillary tube 12 is positioned so as to direct liquid droplets through each of the said apertures.

Terminals 31, 32, are provided for the application of a voltage of about 6,000 volts applying a negative potential to the charging electrode 30 in in divisional conduit 26 with the positive terminal grounded and connected to the metal conduit 11. Terminals 33, 32, are provided for a similar voltage supply to the charging electrode 30 in divisional conduit 27 with the positive terminal 33 connected to the charging electrode 30 while the negative terminal 32 is grounded.

On the conduit 26 side, droplets with positive charges are generated and on the conduit 27 side, negatively charged droplets are produced. The two divisional conduits 26 and 27 are joined to an expansion chamber 25 in which the positive and negatively charged droplets attract each other. This junction produces a charge free area of droplets, which coalesce and are collected upon the sides of the chamber 25. The liquid is then removed from the chamber 25 by way of the conduit 11A.

It will be apparent that each of the capillary tubes 12, in this embodiment of the invention, is surrounded by a dry air conducting duct 19 as shown in FIG. 3.

The embodiment of FIG. 3 is useful for producing chemical reactions. In the FIG. 3 embodiment, the capillary tubes in one divisional conduit may dispense a first reactant which may be a liquid, or dissolved or suspended in a liquid. The other divisional conduit may dispense a second reactant which also may be a liquid, or dissolved or suspended therein. When the charged aerosols of the two conduits 26, 27 reach the expansion chamber 25, the positively and negatively charged droplets will coalesce due to their different polarities. In this manner intimate mixture is achieved and the ratios of the reactants may be controlled stoichiometrically. A wide class of chemical reactants may be practiced in this manner, including acid, alkaline, oxidation, reduction and other reactions well-known to those skilled in the art.

It will be apparent that other types of charged aerosol producing apparatus may be used in the embodiments disclosed herein without departing from the spirit of the invention. FIG. 4, shows one such alternate type of device for simultaneously forming and charging an aerosol. In FIG. 4, water or some other suitable liquid 36 is supplied under pressure through a porous cylinder 37. A supporting ring is spaced from, but disposed around the cylinder 37. A plurality of parallel conductors 38 are carried by the ring 40. The porous cylinder 37 takes the place of the capillary tubes 12 in the other embodiments and the ring 40 and conductors 38 are substituted for the charging electrode ring 15. When the arrangement shown in FIG. 4 is in operation, the water pressure forces droplets of water through the pores in the cylinder 37, which are driven into the intense electric field between the conductors 38 and the porous cylinder 37. The stream of air or gas to be cleaned passes the aerosol forming and charging device as indicated by the arrows in FIG. 4. The droplets absorb the noxious gases and particulate matter as hereinabove set forth until collected on the walls of the conduit (not shown). The charge on each droplet is generated as the droplet leaves the porous cylinder 37 at which juncture it explodes into the sub-microscopic sized liquid particles previously described. A positive potential is applied to the supporting ring 40 and conductors 38 by way of terminal 41. The other end of the potential source is connected to the porous cylinder 37 by way of terminal 42.

The graph of FIG. 5 shows the aerosol current produced by the potential difference applied across the capillary 12 and the charging electrode 15. It will be seen that there is no measurable current when the voltage is 3,000 volts or less. Above 3,000 volts, the current rises in a linear manner until spark-over at about 13,500 volts. Operating the apparatus disclosed herein at 13,000 volts with pure or distilled water gave the best results. The graph shown is for a capillary tube having an opening diameter of $10^{-2}$cm, spaced 1cm from the charging electrode 15 having an open area of $1cm^2$. With these dimensions, the critical electrical field intensity at the surface of the liquid at the capillary tube orifice is concentrated by a factor of $10^4$. This critical electrical field intensity at the liquid surface is $3,000 \times 10^4 = 3 \times 10^7$ volts per cm.

FIG. 6 is another graph, for the same capillary tube 12 and charging electrode 15 showing the variation of the sulfur dioxide concentrations with changes of voltage. Again, there is no absorption at less than 3,000 volts, but the efficiency increases as the voltage is increased so that at 10,000 volts, 99.9% of the sulfur dioxide is removed. The graph indicates that the voltage applied across the capillary tube 12 and the charging electrode 15 is an important independent variable in this process. The experimental data, as shown in the graph, indicates that the input/output ratio R of sulfur dioxide concentration is inversely proportional to the sixth power of the voltage. A similar test run on carbon monoxide revealed that pure water was not sufficient to absorb the gas. Potassium monopersulfate or acid cuprous chloride when added to the water at 5% concentration proved to be effective in absorbing the carbon monoxide.

It has also been discovered that in a given time interval dt, the decrease in the concentration dp of the noxious gas component due to absorption in the charged aerosol droplets in a unit volume of gas is proportional to: the concentration p of the noxious gas component of the gas; the total surface area $A_s$ of the N droplets per unit volume; and a lumped constant K. This relationship may be expressed by the equation:

$$dp = K\ A_s\ p\ dt \qquad (1)$$

The total surface area $A_s$ of all the droplets equals the number of droplets per unit volume N times the surface area per droplet of diameter d:

$$A_s = N\pi\ d^2 \qquad (2)$$

The ratio P of the volume of charged droplets to the unit volume of gas in which they are suspended, is the product of the number of charged droplets per unit volume times the volume per droplet which can be written:

$$P = N\ \pi d^3/6 \qquad (3)$$

By eliminating N and solving the two above equations for $A_s$:

$$A_s = 6P/d \qquad (4)$$

The graph shown in FIG. 7 shows the relation between a flow parameter $\psi$ and the ratio of the sulfur dioxide concentration at the input end of the device to the concentration at the output end. By plotting several relationships, the optimum value of the applied voltage may be determined. To make this determination, certain values of dimensions and velocities can be assigned to produce a flow parameter. One such parameter is:

$$\psi = P/U = (Q_1Q_2)/\ (Q_2/A_2) = A_2\ Q_1/Q_2^2 \qquad (5)$$

where P = ratio of the volume of aerosol liquid to the volume of the aerosol gas, which is the same as P of equation (3).

| | | |
|---|---|---|
| a | = | length of aerosol cloud in cm. |
| $Q_1$ | = | liquid flow rate in $cm^3$/minute. |
| $Q_2$ | = | gas flow rate in $cm^3$/minute. |
| A | = | area of the aerosol cloud in duct in $cm^2$. |
| U | = | velocity of the gas through the duct in cm/minute. |

The curves represent three experimental test runs made at varying values of the applied voltage. The curves indicate that 3.5 kilovolts to 13.5 kilovolts is the voltage range for a charging ring electrode throat area of 1$cm^2$ and a capillary tube electrode with an inside diameter of $10^{-2}$ cm spaced 1cm from the charging ring electrode.

The voltage applied between the capillary tube 12 and the charging ring electrode 15 is an important independent variable. As the voltage increases above a critical value $V_o$ = 3 kilovolts, the minimum concentration ratio decreases rapidly. This suggests that an increase in the applied voltage V to exceed $V_o$ causes the droplet diameter to decrease and the number of droplets to increase, which results in an increase in the surface area $A_s$ of all the droplets in a unit volume of the charged aerosol gas. If R is designated as the ratio of concentrations of the noxious gas to the total gas before and after passage through the purifier, then $R = p/p_o$ where p is the noxious gas concentration after passing through the unit and $p_o$ is the noxious gas concentration at the intake mainfold. Then $R = (V_o/V)^6$ from the above relations and from the slope of the curve in FIG. 6.

The charged aerosol current I carried away on the surface of all the charged droplets is proportional to $A_s$, the surface area per unit gas volume. It has been found that there is a direct proportion between the current, I and the voltage V as shown in the graph in FIG. 5. It follows from the above equations that 1/d is proportional to $V–V_o$ where $V_o$ is the minimum voltage at which the current flows. The following equations follow from the above:

$$1/d = K(V–V_o) \qquad (6)$$

and $R = [1-(V/V_o)^6]e^{-Ka(V-V_o)\psi} + (V/V_o)^6$

It follows, that an optimum flow parameter $\psi_o$ may be defined as a 97% absorption of the noxious gas component sulfur dioxide, from which the corresponding voltage range may be derived from the above. From this definition $a\psi = 3.5$ (97% absorption) for $R \approx 0.01$; which is at the knee of the curve, then:

$$a\psi_o = Ka(V-V_o)\ \psi_o = 3.5 \qquad (7)$$

Hence the optimum flow parameter is a function only of the voltage V:

$$\psi_o = (3.5/ka)\ [1/(V-V_o)] \qquad (8)$$

Hence:

$$\psi_o = [3 \times 10^{-8}\ /\ (V-3)](cm/min)^{-1} \qquad (9)$$

The optimum flow parameter $\psi_o$ is considered to be an optimum value because:

1. for $\psi < \psi_o$ the concentration ratio R increases rapidly to 1;
2. for $\psi > \psi_o$ the concentration ratio R does not become significantly less, because at $\psi = \psi_o$, R has already reached the small value of 0.04, and the minimum value has been taken as equal to 0.01. The optimum flow parameter varies between $60 \times 10^{-9}$ to $3.3 \times 10^{-9}$ $(cm/min)^{-1}$, or $36 \times 10^{-5}$ to $2 \times 10^{-5}$ $(m/s)^{-1}$ for 3.5 to 12 kv respectively. If voltages V < 5kv are excluded because R is too large; that is; 1 < R < 0.03; and voltages V > 15kv are excluded because of electrical breakdown; then the range of optimum flow parameter for 5 < V < 15 is: $1.5 \times 10^{-8} < \psi_o < 2.5 \times 10^{-9}$, or $9 \times 10^{-5} < \psi_o$ 1.5 $\times 10^{-5}(m/s)^{1}$.

A voltage of 13.5 kv with pure water resulted in the smallest flow parameter, smallest concentration ratio R and a maximum gas flow rate.

The air stream flow power in the air purifiers disclosed herein can be utilized as a charged aerosol generator, transforming the heat kinetic power of the air stream directly into electrical power. The resulting electrical power can be used to drive the air purifier which will then require no external source of power other than that used to drive the air stream. Such a conversion system is described in U.S. Pat. No. 3,518,461, issued June 30, 1970, Alvin M. Marks. After starting, the system can produce additional electrical energy which can be used for other purposes.

The air purifier shown in FIG. 8 is a specific embodiment of a combined air purifier and generator as a self-sustaining combination. Two separate charged aerosol air purifiers 45 and 46 are shown cross-connected so that the electric power generated by each purifier operates the other. Each purifier includes an entrance conduit 11 where the polluted air or gas 13 is forced past the capillary tube 12 and through the charging electrode ring 15. A short distance downstream from the charging electrode ring 15 is an annular insulator 47 which electically isolates a section 50,51 of each of the conductive conduits 11 so that its voltage may be used to power the other purifier. A second annular insulator 52, 53 on each conduit 11 insulates the high voltage section from the grounded exhaust portion 54 which carries off the waste water, the particulates, and the absorbed gas. The voltage sections 50, 51 of the conduits 11 are connected by conductors 55, 56 to a starting generator 57 which may be a nuclear battery.

To start the operation, switch 58 is closed and the charged droplets 12A move to the inner surface of sections 50, 51 charging them to positive and negative voltages of about 50 kilovolts. Then the switch 58 is opened and the operation of the device continues. A voltage divider 60 is connected between the two sections 50, 51 and a first tap 61 applies about +8 kilovolts to charging electrode ring 15 in purifier 46 while a second tap 62 applies about −8 kilovolts to charging electrode ring 15 in purifier 45. The electrical power generated by the insulated rings 50, 51 is taken from the heat kinetic input gas 13 forced through the air purifiers.

For the absorption of sulfur dioxide, tests have been run with a capillary tube liquid comprising 3, 5, and 10% sodium chloride, and pure water. The best results were obtained with pure water at 13.5 kilovolts; next best, with 3% sodium chloride at 7.8 kilovolts. In many of the tests the voltage was limited in value because of sparking. The least sparking was observed with pure water for which the greatest voltage was applied (13.5KV) and the best results obtained.

Sparking can be further restricted by coating the charging electrode supporting member with a material which water does not wet, such as poly tetrafluoroethylene (Teflon). With most materials which are wettable by water, a continuous film of water is formed which can short out the voltage applied to the electrodes, particularly when moist fumes are introduced into the air purifier. With a non-wetting surface, the moisture forms droplets. This discontinuous droplet configuration greatly reduces sparking.

Figure 9:
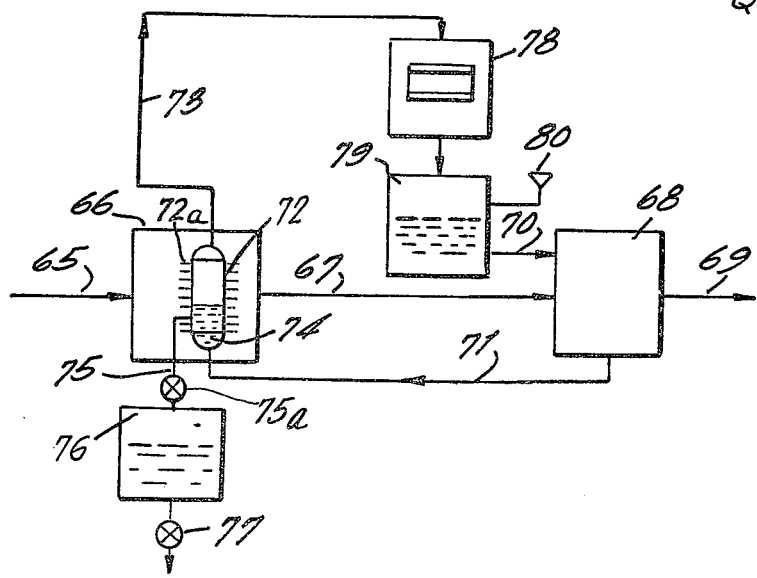
FIG. 9 is a diagrammatic showing of an air purifier for use with high temperature exhaust gases.

Referring to FIG. 9 there is shown an air purifier which is particularly adapted for use in connection with automotive exhaust gases or other high temperature exhausts. These gases are at such a high temperature that the charged aerosol droplets, if brought into contact therewith, will evaporate. In this embodiment of the invention, the hot exhaust gases are pre-cooled to between 30° to 70°C to prevent excessive evaporation of the charged aerosol droplets. In addition, the water employed for forming the charged aerosol is evaporated, recycled and then re-introduced into the system, thereby reducing the amount of water necessary to operate the device.

In the block diagram shown in FIG. 9, all of the components are made equal in size so as not to indicate the relative size or shape of the components. The high temperature exhaust gases from the engine (not shown) enter the purifier by way of a pipe 65 and are led into a heat exchanger 66, which may be air cooled. The heat exchanger 66, for example, could be placed immediately behind the water/heat exchanger employed in most water cooled automobiles, where the incoming air cools the water. The cooled gases leave the heat exchanger by way of pipe 67 and pass through a charged aerosol purifier device 68, such as is shown in FIGS. 1, 3, and 8. The purified or clean air is emitted from the aerosol air purifier 68 by way of exhaust pipe 69. Liquid in the form of water is supplied to the charged aerosol air purifier through pipe 70. The collected droplets containing the products of combustion leave the charged aerosol air purifier 68 through fluid line 71. The water in line 71 containing the reacted noxious gases as a solute, the particles in suspension, and emulsified hydrocarbons in suspension, is led into a heat exchanger, or boiler 72 where the excess water is evaporated. The heat is provided from the high temperature gases entering through pipe 65 into a duct or chamber 66 which surrounds the heat exhanger or boiler 72. The heat is transferred from the high temperature exhaust within the duct 66 through the heat exchanger and into the water contained within the boiler, causing the evaporation of the excess water to form steam which passes through the pipe 73. The heat exchanger 72 may have for example fins 72A which facilitate the heat exchange, and the pipe 75 may have a value 75A to control concentrated sludge which remains after the evaporation of the excess water within the boiler 72. The water evaporates as steam from the boiler 72 and passes through a pipe 73. The concentrated residual sludge indicated at 74 within the boiler 72 is withdrawn from the boiler via the pipe 75 and led into a holding tank 76. The sludge 74 accumulates within the holding tank and may be removed therefrom from time to time by means of the valve 77. The evaporated water passing through line 73 is first led into an air cooled condenser 78, from which it is fed as a liquid into the water supply tank 79 of the charged aerosol air purifier. Additional water may be added as needed to the tank 79 by way of valve 80.

From the above description and graphs it should be evident that:

a. Above a critical applied voltage, electrically charged water in an air suspension subdivides into larger numbers of submicron size charged droplets having collectively increased surface area;

b. The charged submicron droplets, which may contain a reactive solute, when dispersed in a gas, absorb, and/or react with the various noxious gases therein, such as sulfur dioxide, nitrogen oxides, carbon monoxide, and other gases;

c. Positive or negative charged water droplets seem to be equally effective for the removal of sulfur dioxide from the air or gas;

d. The charged aerosol containing the noxious gases and particulates, under mutual repulsion, rapidly move to the walls of the conduit, discharge and run off as a residual waste fluid in which the noxious gases and particulates are entrained;

e. New theoretical equations and parameters describing the process are derived, which show good correlation with test data for sulfur dioxide;

f. Sulfur dioxide was effectively removed by pure water only or with an alkaline reactant added;

g. The removal of nitrogen dioxide required an alkali reactant such as sodium hydroxide NaOH;

h. The removal of carbon monoxide required an oxidant. The effectiveness varied with the chemical nature of the oxidant;

i. The air purification process is more efficient at greater potential differences between the aerosol forming and charging electrodes, this being an important variable quantity. At greater voltages, higher gas velocities can be used at the same efficiency;

j. Optimum operating conditions have been established in terms of an optimum flow parameter $\psi$ as a function of the applied voltage.

Having thus fully described the invention, what is claimed as new and desired to be secured by Letters Patent of the United States, is:

1. A gas purifier for removing noxious gases and particulates from a stream of gases comprising a first conduit to receive and direct the stream of gases therethrough, a source of water comprising a fluid bearing line containing water under positive pressure disposed within the conduit, a reactant for the noxious gases in said water, a second conduit within the first conduit around said water source and in communication with a source of clean air under pressure, an apertured charging electrode mounted in the second conduit downstream of the water source and within the clean air duct, a source of electrical potential connected between the charging electrode and the water source for creating an intense electric field between the water source and the charging electrode to simultaneously charge and sub-divide the water and reactant into sub-micron charged droplets as they move into the stream of gases within the first conduit and means downstream of the charging electrode to collect and discharge the charged water and reactant droplets together with the gases and particulates entrained thereby.

* * * * *